United States Patent [19]

Sposato

[11] Patent Number: 5,781,228
[45] Date of Patent: Jul. 14, 1998

[54] METHOD AND SYSTEM FOR DISPLAYING AN INTERACTIVE PROGRAM WITH INTERVENING INFORMATIONAL SEGMENTS

[75] Inventor: Jonathan N. Sposato, Issaquah, Wash.

[73] Assignee: Microsoft Corporation, Redmond, Wash.

[21] Appl. No.: 524,619

[22] Filed: Sep. 7, 1995

[51] Int. Cl.$^6$ ................................................ H04N 7/173
[52] U.S. Cl. ........................... 348/13; 348/12; 348/7; 455/5.1
[58] Field of Search ......................... 348/13, 12, 6, 348/7, 10, 11, 906, 563, 564; 455/4, 2, 5.1, 6.1, 6.2, 6.3; H04N 7/16, 7/173

[56] References Cited

U.S. PATENT DOCUMENTS

| | | | |
|---|---|---|---|
| 5,585,838 | 12/1996 | Lawler et al. | 348/906 |
| 5,608,446 | 3/1997 | Carr et al. | 348/6 |
| 5,621,456 | 4/1997 | Florin et al. | 348/13 |
| 5,654,748 | 8/1997 | Matthews | 348/13 |

*Primary Examiner*—Chris Grant
*Attorney, Agent, or Firm*—Jones & Askew, LLP

[57] ABSTRACT

In association with an interactive television system, a method and system for displaying an interactive program having intervening informational segments. When additional information is available, an additional information marker is displayed on the display screen and is selected by manipulating a remote control. When the additional information marker is selected, the display of the interactive program is terminated, and an intervening informational segment, a short segment of information, is displayed in its place. When the intervening informational segment is terminated, the interactive program is displayed beginning from a predetermined return point. The return point is dependent on the time, relative to the beginning of the interactive program, at which the additional information marker was selected. Each return point is located during a pause or a natural break in the audio and video of the interactive program such that the resumption of the program after the intervening informational segment is smooth. When an intervening informational segment is terminated, the time at which the additional information marker associated with the intervening informational segment was selected is compared to a table storing the predetermined return points. Once the predetermined return point is obtained, the interactive program is displayed beginning at the return point.

43 Claims, 6 Drawing Sheets

| TIME | RETURN POINT |
|---|---|
| ⋮ | ⋮ |
| $t_1 - t_2$ | $t_{R1}$ |
| $t_2 - t_3$ | $t_{R2}$ |
| $t_3 - t_4$ | $t_{R3}$ |
| ⋮ | ⋮ |

METHOD AND SYSTEM FOR DISPLAYING AN INTERACTIVE PROGRAM WITH INTERVENING INFORMATIONAL SEGMENTS

TECHNICAL FIELD

The present invention relates generally to the display of a video stream in an interactive program and, more specifically, to a user interface for displaying an additional information marker associated with intervening informational segments.

BACKGROUND OF THE INVENTION

Various forms of interactive communications systems display video data to users as part of an interactive program, game, or other display. Popular interactive communications media include cable television systems, CD-ROM, video-disk systems, or any other video media that displays data in the form of video streams to users. Because these media are gaining in popularity and availability, the use of interactive programs that provide a user interface to accept user input and to display selected video data are becoming more widespread.

Perhaps the most well-known of these types of media is the community-antenna television (CATV) systems. CATV systems are broadband communications networks of coaxial cable and optical fiber that distribute video, audio, and data signals to the homes or businesses of subscribers. In a typical CATV system, a single advantageously located antenna array feeding a cable network supplies each individual subscriber with a usable television signal.

CATV networks have experienced enormous growth and expansion in the United States, particularly in urban areas. It is estimated that CATV networks currently pass near and are accessible to approximately 90% of the population in the United States, with approximately 60–65% of all households actually being connected to such communications networks. While cable systems originally had very simple architectures and provided a limited number of different television signals, the increase in the number of television broadcasters, owners, and services over the last several decades has resulted in much more complex modern cable distribution systems.

A typical CATV system for the delivery of television programming to subscribers comprises three main elements: a headend, a distribution system, and subscriber drops.

The "headend" is a signal reception and processing center that collects, organizes, and distributes signals. The headend receives satellite-delivered video and audio programming, over-the-air broadcast television station signals, and network feeds delivered by terrestrial microwave and other communication systems.

The "distribution system" carries the signals from the headend to a number of distribution points in a community and, in turn, distributes these signals to individual neighborhoods for delivery to subscribers.

"Subscriber drops" are taps in the distribution system that feed individual 75 Ω coaxial cable lines into subscribers' television sets or subscriber set-top terminals, often referred to as "subscriber premises equipment" or "customer premises equipment" ("CPE").

CATV distribution systems were originally designed to distribute television signals in the "downstream" direction only, i.e., from a central headend location to multiple subscriber locations, also referred to as the "forward" path. The advent of pay-per-view services and other interactive television applications has fueled the development of bidirectional or "two-way" cable systems that also provide for the transmission of signals from the subscriber locations back to the headend via an "upstream" direction or a "reverse" path. By upgrading CATV systems employing relatively limited bandwidth coaxial cable with broadband distribution networks having HFC configurations, multiple service operators (MSOs) can use the additional channels gained by this wider bandwidth network to provide many new subscriber services. This ever-expanding deployment of fiber optic technology supports the implementation of an "interactive network" to allow a subscriber to obtain desirable service of programming at a time and date specified by the subscriber. Indeed, it is feasible that this interactive network will have sufficient bandwidth to supply hundreds of channels of programming information, thereby leading to an explosion of program options available to subscribers. Potential subscriber services supported by this interactive network include Movies on Demand (MOD) or Video on Demand (VOD), interactive computing, shopping, entertainment, and other related services.

The delivery of a variety of interactive services via a broadband network distribution system raises the critical issue of defining an efficient mechanism for presenting both operation and program-related information to an audience of possible consumers representing diverse technological backgrounds and interests. From an ergonomic perspective, this "user interface" for such an interactive network should appeal to a "typical" viewer of standard broadcast television programs and should be easy for this typical person to understand and use. Because computer users reflect only a portion of the overall audience for interactive services, it is desirable that the features of this user interface be based upon the assumption that the typical viewer is not familiar with user interface customs that are otherwise acceptable and understood by the computer-literate community. In addition, the functions of the user interface should be controllable with a control device familiar to this typical television viewer, such as a handheld remote control. This user interface also should be easily readable from a typical viewing distance that separates the viewer from a television screen.

The typical television viewer is accustomed to viewing sophisticated graphics for broadcast programs that are produced with complex and expensive production equipment. It is desirable for the user interface of an interactive network to support similar graphical features, including visual objects having a 3-dimensional appearance, image transition effects such as wipes, dissolves, and tumbles, and a variety of colors and fonts. This user interface also preferably supports active animation of displayed objects to entertain the viewer and to focus the viewer's attention upon a particular object for controlling a feature of the user interface. The user interface also should be sufficiently flexible in appearance to allow a service provider to design and implement objects having a unique appearance for different applications, thereby permitting a user to distinguish these applications.

The many subscriber services supported by interactive television networks give users the ability to communicate with the network to view specific types of interactive programming. Interactive programs may include games or other applications in which progression of the program is dependent on user's input and/or selection of objects displayed on the screen. These interactive programs may allow user input to propel the program in a desired direction or to provide a user with certain information.

Other interactive programs are similar to standard television programs in that the program continues uninterrupted from beginning to end in the absence of user input. However, certain user input during an interactive program may cause the program to be delayed and then resumed at a later time. Resumption of the program at the precise point of delay may cause the video or audio content of the program to be undesirably interrupted, such as by resuming the program when the speaker is in the middle of saying a word or in the middle of a sentence. Such resumptions cause the program to appear choppy and may cause the viewer to misunderstand the audio or video content of the interactive program, thus diminishing the effectiveness and enjoyment of the program.

SUMMARY OF THE INVENTION

The present invention provides a method and system for displaying an interactive program having intervening informational segments. During display of the interactive program, additional information associated with the subject of the program may be available to the user. When such information is available, an additional information marker is displayed on the display screen. The additional information marker is typically textual (but it may be any combination of text, graphics, and/or animation) and identifies the subject matter of the additional information. The display of the additional information marker is altered in such a way that draws the user's attention to the additional information marker. The additional information marker is selected by pressing the action button on the remote control.

When the additional information marker is selected, the display of the interactive program is terminated, and an intervening informational segment is displayed in its place. The intervening informational segment is a short segment of information identified by the additional information marker. An exit button is displayed during the intervening informational segment. When the exit button is selected by the user, the intervening informational segment is terminated, and the interactive program is displayed beginning from a predetermined return point. The return point is dependent on the time, relative to the beginning of the interactive program, at which the additional information marker was selected.

The interactive program is preprocessed to determine the desired locations of return points. Each return point is located during a pause or a natural break in the audio and video of the interactive program such that the resumption of the program after the intervening informational segment is smooth. The return points and the various times during which an additional information marker may be selected are stored in a table. When an intervening informational segment is terminated, the time at which the additional information marker associated with the intervening informational segment was selected is compared to the table to determine the corresponding return point. Once the predetermined return point is obtained, the interactive program is resumed beginning at the return point.

DETAILED DESCRIPTION OF THE PREFERRED EMBODIMENT

Turning next to the figures, the preferred embodiment will now be described in detail. The preferred embodiment of the present invention relates to a method of displaying a linear program in a non-linear manner. Although the preferred embodiment of the present invention will be described with respect to subscriber services associated with an interactive television network system displayed to a user on a television display screen, those skilled in the art will recognize that the present invention is not limited merely to the communications media described herein and may be utilized in connection with other forms of communications media and other input and output display devices. Other forms of communications media may include those media in which a video stream is displayed to a user, such as CD-ROM, video disk systems, on-line services, or any other video or audio media.

In general, the present invention provides a method and system for user-navigation of an interactive program having intervening informational segments. The present invention displays an additional information marker, such as a graphical representation of a real or imaginary object, or icon, or text, called a "hot word", on the display screen at specific times during the interactive program. The additional information marker is preferably a word that identifies a topic or subject related to the contents of the program. By selecting the additional information marker, the user causes the program to be temporarily replaced with an intervening informational segment of audio, video, or other display, called an "info-clip", the content of which is defined by the additional information marker. Selecting an exit button displayed during the intervening informational segment causes the intervening informational segment to be removed from the display screen, and the program resumes from a predetermined point at or prior to the point at which the additional information marker was selected. The return point is determined by comparing the time of selection of the additional information marker with a table identifying predetermined return points based on the content of the program.

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Furthermore, it should be understood that there is a distinction between the methods, steps, or operations completed by a computer, and the method of computation itself. The present invention does not involve a method of computation. Instead, the present invention relates to methods, processes, steps, or operations for a computer and the processing of electrical or other physical signals to generate desired physical signals and to display results and interactions.

The preferred embodiment of the present invention is directed to a user interface for an interactive network system that can deliver a variety of services, including entertainment, information, and transaction services, to consumers via an interactive broadband network. This user interface, which is typically presented via an output device, such as a display or monitor, can include one or more control items or images representing various control functions associated with the operation of the interactive network. For example, the user interface can include control items representing functions for controlling a display of available program options. The present invention provides a system for both "highlighting" the currently selected control item and for supplying the user with an indication of other control items that are available for selection by the user. The innovative solution provided by this system addresses the requirements of limited display "real estate" for displaying such control images, as well as the dynamic nature of programming information presented by the interactive network.

Although the preferred embodiment will be generally described as an interactive television system for delivering broadcast television programs and related information, those skilled in the art will recognize that the present invention also can be used to support the delivery of other forms of programming information, including radio, broadcast print, audio, games, computer software, including program modules such as application programs and operating systems, and other combinations of audio, video and/or computer software. Accordingly, it will be understood that programming information generally includes information transmitted electronically to entertain, instruct, educate, or inform the recipient, as well as program modules for supporting these services.

Likewise, those skilled in the art will also appreciate that the present invention can be extended to communicating control information within the general purpose computing environment. Specifically, the present invention supports user interfaces for displaying control information with general purpose computer systems, including desktop computers, portable computers, and handheld computers, including personal digital administrators.

Figure 1:
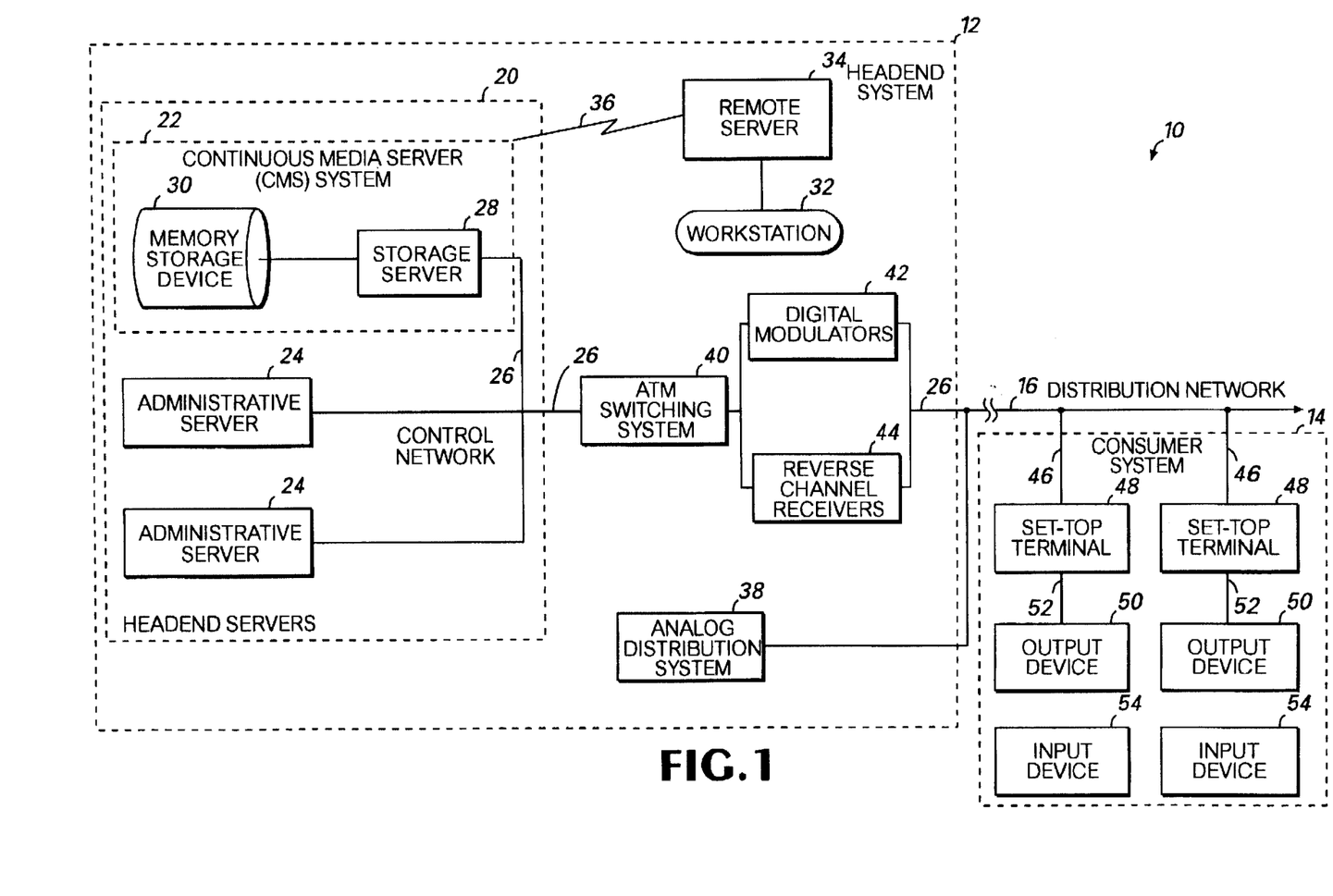
FIG. 1 is a block diagram of the operating environment for an interactive network system.

Turning now to the drawings, in which like numerals indicate like elements throughout the several figures, FIG. 1 illustrates the operating environment for an interactive network system in accordance with the preferred embodiment of the present invention. Referring to FIG. 1, the interactive network system 10 includes a headend system 12 for delivering programming information to and receiving instructions from a consumer system 14 via a "two-way" distribution network 16. The headend system 12 is the control center for collecting, organizing, and distributing the signals for all interactive network operations and the source for all programming information. The distribution network 16 transports signals carrying programming information and instructions between the headend system 12 and the consumer system 14. The distribution network 16 can include a world-wide public asynchronous transfer mode (ATM) compatible network with links to the Internet, third party service providers, and other wired and wireless communications networks. The consumer system 14 includes the equipment required for a consumer to receive programming information directly at his or her office or residence and to transmit requests and instructions to the headend system 12.

The headend system 12 can include a set of headend servers 20, including a continuous media server (CMS) system 22 and one or more administrative servers 24, to support various network functions, and a control network 26 linking these headend servers. The headend servers 20 can execute program modules, including service and application program software, to support the transmission of programming information and the reception of requests for such programming information.

It will be appreciated that the headend servers 20 are not necessarily located in one physical location, but can be linked by wired and/or wireless communications paths supplied by the control network. The control network 26 can be a local area network, a wide area network, or a combination of both types of networks. For the preferred embodiment, the control network 26 is implemented as an ATM-based network for routing digital data between the headend servers 20 and the distribution network 16.

The CMS system 22 is a server-based file storage and delivery system that can manage on-demand access to stored digitized data. On-demand access of digitized data is a particularly desirable characteristic of the CMS system 22 if the interactive network supports the delivery of Video on Demand (VOD) or Movies on Demand (MOD) services.

The preferred CMS system 22 can supply digital data streams at a constant rate to numerous consumers of the consumer system 14.

The CMS system 22 includes one or more storage servers 28, which operate to retrieve and to transmit the digitized data as required by clients of the CMS system, i.e., the equipment of the consumer system 14. The digitized data, which typically comprises programming information, is maintained on one or more memory storage devices 30 connected to the storage servers 28. Each memory storage device 30 can be implemented as a SCSI hard disk drive, an optical storage system, or any other similar mass storage media. By spreading the data management operations across a group of storage servers and memory storage devices, user load can be balanced with the limited disk, network, and input/output (I/O) resources of the headend system. This also supports fault tolerance by replicating digitized data within the CMS system 22 to survive the failure of a storage server or a memory storage device.

To support the tasks of updating or revising programming information stored on a memory storage device 30 of the CMS system 22, a computer workstation 32 and a remote server 34 can be connected to the control network 26 via a communications link 36. This communications link allows a program distributor or supplier, which typically operates at a location remote from the CMS system 22, to transmit programming information for storage by one or more of the memory storage devices 30 and eventual distribution to consumers via the headend system 12. The communications link 36 can be implemented by either a wireless or wired communications system. For example, the communications link 36 can be constructed as a microwave link or as a conventional telephone link.

The administrative servers 24 of the headend system 12 can support a variety of services and applications associated with the interactive network system 10, including network security, monitoring, object storage, financial transactions, data management, and other administrative functions. The administrative servers 24 also handle the interactive service requests or instructions transmitted via the consumer system 14 by consumers. For an application involving a large base of consumers, an administrative server 24 is preferably dedicated to a particular service or function. For example, one or more servers can handle all consumer authorization requirements, whereas other servers can handle network management services, and so forth. These administrative servers preferably support the Simple Network Management Protocol (SNMP) to enable end-to-end network administration and monitoring.

The headend system 12 also can support the distribution of programming information and other services via an analog distribution system 38 that is coupled to the distribution network 16. This distribution of analog formatted signals can be handled by a separate headend system associated with a community antenna television (CATV) system. The headend of the CATV system typically supports satellite-delivered video and audio programs, over-the-air broadcast television station signals, and broadcast network signal feeds delivered by microwave and other communications systems.

The distribution network 16 is a two-way communications network that connects the headend system 12 to various community distribution points of the consumer system 14 and, in turn, to individual neighborhood nodes for delivery to consumers of services supplied by the interactive network system 10. The distribution network 16 comprises one or more downstream channels supporting transmissions from the headend system to the consumer system and one or more upstream channels for carrying transmissions from the consumer system to the headend system. This bidirectional communications network supports delivery of programming information via the headend system 12 to each consumer and the delivery of requests for programming information by a consumer to the headend system 12. The distribution network 16 can be implemented by a microwave distribution system, a telephone system, coaxial cables, optical fibers, or any combination of these delivery systems. However, the preferred distribution network is implemented by a combination of hybrid optical fiber/coaxial cable (HFC) and optical fiber-to-the-curb (FTTC).

Those persons skilled in the art will appreciate that the programming information delivered over the distribution network 16 typically comprises both video and audio signals. Programming information can be delivered in digital format, analog format, or a combination of both analog and digital formats. For the preferred embodiment, television-related programming is delivered as a stream of digital video and/or audio signals in a compressed digital data stream, including conventional MPEG-1 and MPEG-2 compressed video streams. Likewise, requests or instructions issued by consumers via the consumer system 14 are preferably formatted as digital signals.

The CMS system 22 and the administrative servers 24 are connected to the distribution network 16 via an ATM switching system 40. The ATM switching system 40 supports network switching requirements for delivery by the headend system 12 of digital data streams carrying multimedia content and the handling of interactive service requests from consumers.

Because the interactive network 10 is a two-way communications system, the ATM switching system 40 preferably connects to the distribution network 16 via modulation/demodulation devices. The downstream channels of the distribution network 16 can be connected to the ATM switching system 40 via digital modulators 42, whereas the reverse channels of the distribution network 16 are connected to reverse channel receivers 44.

Each consumer within a neighborhood node of the consumer system 14 is connected to the distribution network 16 via a subscriber drop cable 46, which is typically part of a local cable network administered by a multiple service operator (MSO). The drop cable 46 is typically a coaxial cable or optical fiber connected to a set-top terminal 48 or set-top box located at the consumer's location. This combination of the drop cable 46 and the set-top terminal 48 operates as a "tap" into the distribution network 16, and allows the consumer to (1) receive program modules and programming information distributed by the headend system 12 and to (2) transmit requests or instructions to the headend system 12. For example, the set-top terminal 48 can accept and convert signals carrying programming information to a format compatible for presentation by an output device 50, such as a television or a computer system. This output device 50, which can be connected to the set-top terminal via a conductive path 52 such as coaxial cable, preferably includes a receiver and a display or monitor for receiving and displaying programs and program-related information. Those skilled in the art will understand that the output device 50 can be implemented as a combination of separate components, such as a receiver and a monitor, or as a single component, such as a conventional television or a general purpose computer system.

Selected operating functions of the set-top terminal 48 can be controlled by an input device 54 capable of supplying input data to the set-top terminal 48. The input device 54 can be used to transmit command signals to the set-top terminal 48 and to input character-based data, such as text, for processing by the set-top terminal 48. For example, the input device 54 can be used to control the position of a display object presented by the output device or to enter text for conducting a service-related transaction supported by the interactive network 10. The input device 54 can be implemented as one or more devices for inputting data, including a handheld control, a keyboard, a mouse device, a game control, a joystick, a pen or stylus, a trackball, or a track pad.

For the preferred embodiment, the input device 54 is implemented as a handheld remote control capable of transmitting infrared signals carrying commands for controlling the operation of the set-top terminal 48. The remote control can include a directional keypad having distinct keys, or a joystick, for allowing the user to control direction (up, down, left, right) and relative changes in volume or channel (increase or decrease), as well as absolute changes to channel value via a numeric key pad. The remote control and its functions are more fully described with respect to FIG. 3.

Figure 2:
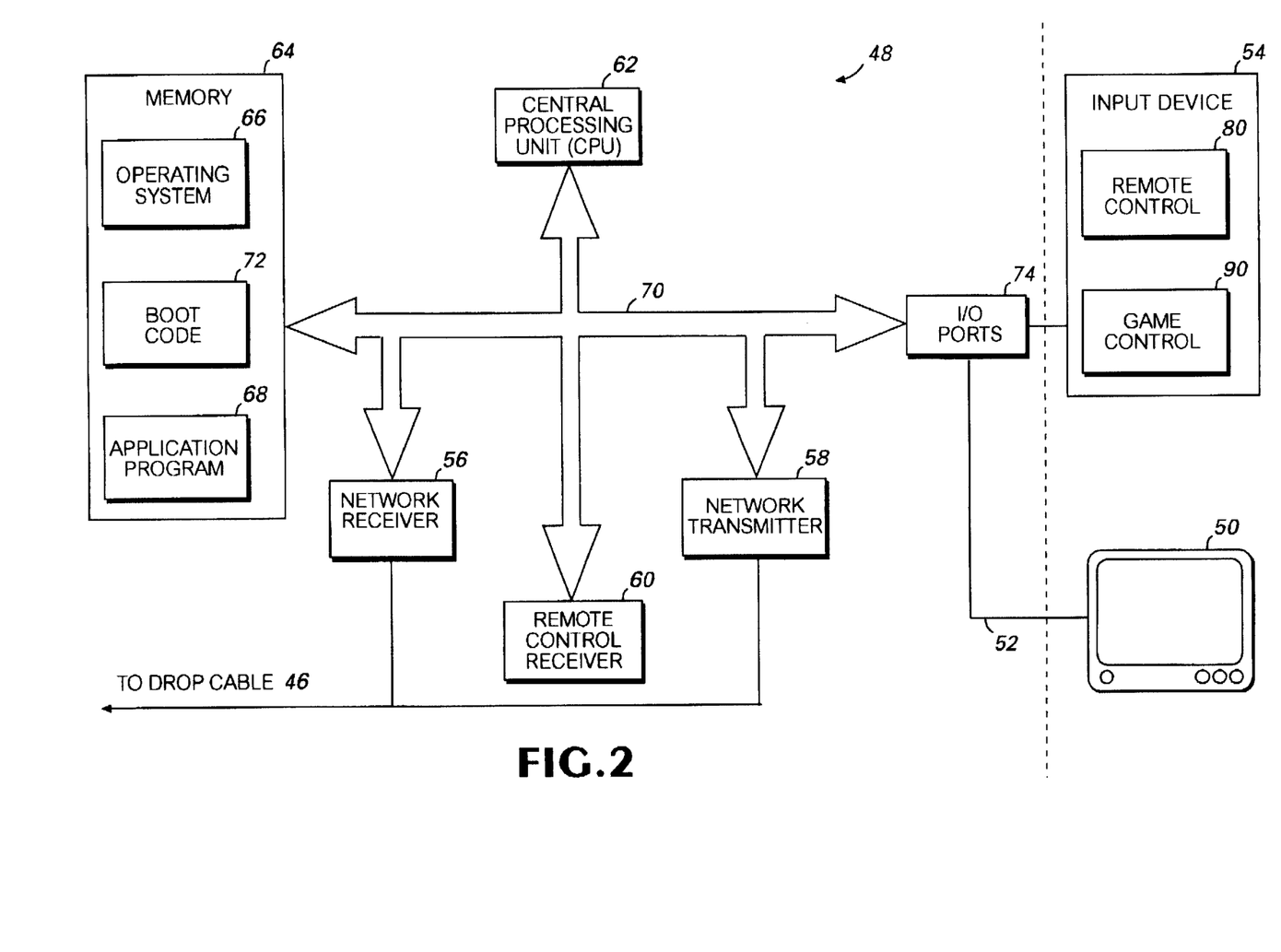
FIG. 2 is a block diagram of the basic components of a set-top or user terminal.

FIG. 2 illustrates the basic components of the set-top terminal 48. Turning now to FIGS. 1 and 2, the primary components for the set-top terminal 48 include a network receiver 56, a network transmitter 58, a remote control receiver 60, a central processing unit (CPU) 62, and memory 64. These components are connected by a system bus 70, which can carry control, address, and data signals. The network receiver 56 conducts tuning operations for receiving a selected channel of the interactive network 10 and decoding operations for decoding compressed digitized data supplied via the interactive network 10. For example, the set-top terminal 48 can include MPEG decoding capability for converting the compressed digitized data into standard National Television Standard Committee (NTSC) video signals for reception by a conventional television. The network transmitter 58 transmits requests for programming information and related instructions for processing by the headend system 12. The network receiver 56 and the network transmitter 58 can be connected to the distribution network 16 via the drop cable 46. The remote control receiver 60, which is preferably implemented as an infrared receiving device, can decode signals carrying the commands issued by the input device 50, such as a remote control 80.

The CPU 62, which is connected to the network receiver and transmitter 56 and 58, as well as to the remote control receiver 60, controls the operations of the set-top terminal 48 and supports the rendering of graphical images of the user interface. The CPU 62 is typically implemented by at least one microprocessor, such as the model 80486 or the "PENTIUM" microprocessor, manufactured by Intel Corporation, Santa Clara, Calif. The CPU 62 communicates, by means of control, address, and data signals, with the remaining components of the set-top terminal 48 through the system bus 70. The CPU 62 operates in conjunction with the operating system 66 to retrieve, process, store, and display data. It will be appreciated that the processing functions of the CPU 62 may be divided among two or more microprocessors to support the presentation of a graphics-intensive user interface. For example, a microprocessor may be dedicated to control operations associated with the bi-directional communications with the headend system 12, whereas another microprocessor may be dedicated to the generation of graphics.

The memory 64, which is connected to the CPU 62, is useful for storing one or more program modules and data associated with set-top terminal operations. Program modules stored in the memory 64 can include an operating system 66 and one or more application programs 68. The memory 64 can be implemented as a combination of dynamic memory, such as random access memory (RAM), and static memory, such as read only memory (ROM).

The operating system 66 comprises a set of computer programs that control the internal functions of the set-top terminal and support the execution of other program modules, including application programs 68. The preferred operating system 66 supports a graphics-based presentation of program-related information, including control items that visually represent control functions of the operating system and other program modules. A control item is any visual image that can be manipulated by the user to perform an operation. The operating system 66 can receive and interpret input data supplied by the input device 54, as received by the remote control receiver 60. As will be described in more detail below with respect to FIG. 3, a user can "select" and "launch" control items by the use of the input device 54 in a manner similar to the computer arts.

For the preferred set-top terminal 48, the memory includes a ROM containing at least a portion of program module representing "boot code" 72 for initializing the operations of the set-top terminal 48. Upon power-up of the set-top terminal 48, the boot code 72 initiates a request for the headend system 12 to download certain program modules, including the operating system 66 and one or more application programs 68. The program modules can be stored within the memory 64 of the set-top terminal 48. This downloading process allows the headend system 12 to easily update the program modules used in set-top terminals 48 throughout the interactive network 10. For example, the application programs 68 may be maintained within the set-top terminal 48 only during actual use of the features of these programs; otherwise, these application programs are maintained at the headend system 12. Thus, it will be appreciated that the preferred set-top terminal 48 relies heavily upon data storage mechanisms located at the headend system 12 rather than within the set-top terminal 48 itself.

The set-top terminal 48 can be connected to a peripheral device via input/output (I/O) ports 74. The I/O ports 74 support the connection of the system bus 70 to a connected peripheral device. For example, the output device 50 can be connected to the I/O ports 74 via a conductor 52. Likewise, an input device 54, such as a game control 90, can be connected to the I/O ports 74. In contrast to the remote control 80, which communicates with the remote control receiver 60 via a wireless communications link, other types of input devices 54 are typically connected to the I/O ports 74 via a cable. Nevertheless, those skilled in the art will appreciate that input devices 54 can communicate with the set-top terminal 48 by use of either wireless or wired communications links.

Generally, when a user first powers-up a set-top terminal 48, the set-top terminal 48 contacts the headend system 12 and requests the downloading of certain program modules, including the operating system 66. In response to loading these program modules, the set-top terminal 48 enters a stand-by mode to limit power consumption and awaits a command signal initiated by a user pressing a key or button on an input device 54, such as a remote control 80. In this stand-by mode, the set-top terminal can communicate with the headend system and can respond to administrative requests transmitted by the headend system 12. In the event that a user tunes to an interactive channel (typically by pressing the appropriate function key of the remote control), the set-top terminal 48 changes modes and enters the active mode. In the active mode, the set-top terminal 48 communicates with the headend system 12 to process the instructions transmitted by the remote control. For example, the set-top terminal 48 responds to a command requesting programming information by forwarding this instruction to the headend system 12 via the drop cable 46 and the distribution network 16. The headend system 12 responds by retrieving selected programming information from the CMS system 22 and transmitting the selected programming information via the return path provided by the distribution network 16 and the drop cable 46. The set-top terminal then supplies this programming information in the proper format for presentation by the display.

Figure 4A:
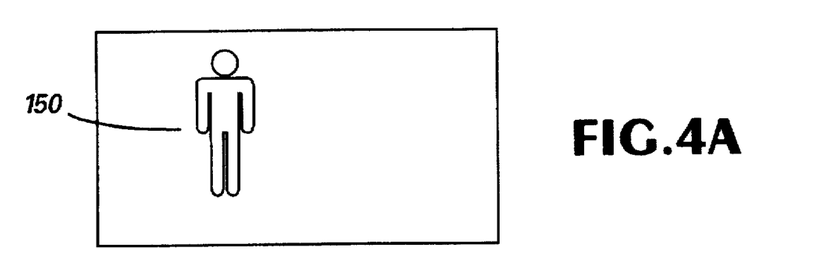
FIGS. 4A–C show the display screen as it would appear during various stages of an interactive program displayed in accordance with the present invention.
Figure 4B:
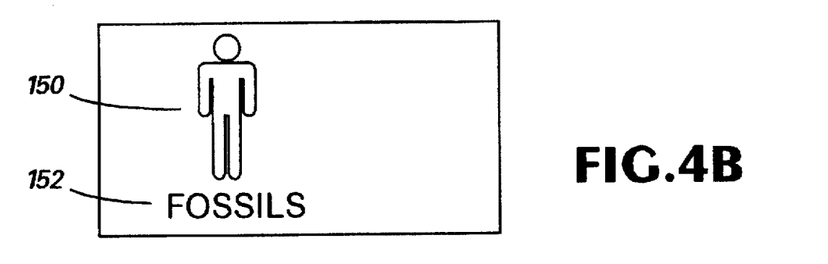
Figure 4C:
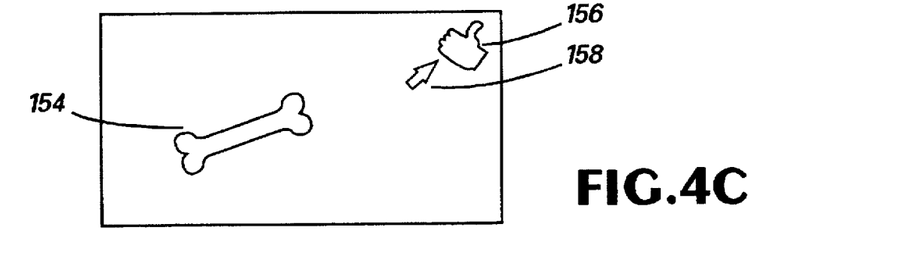

In accordance with the preferred embodiment of the present invention, the output device 50 in connection with an interactive network system 10 displays an interactive program on a display, preferably a television display screen, as shown in FIGS. 4A–C. The various interactive programs may display objects to the user on the display screen that the user may select to initiate predetermined functions.

Figure 3:
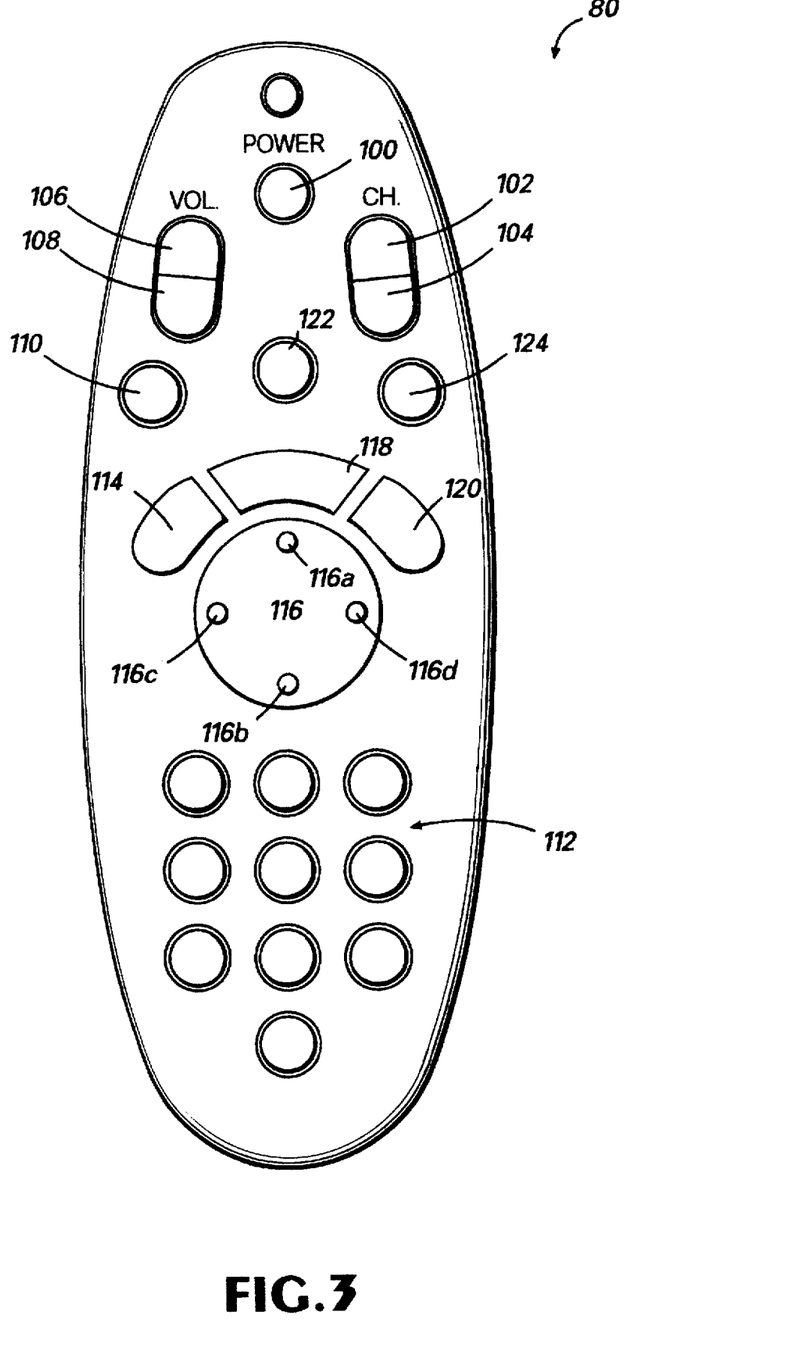
FIG. 3 shows the face of a remote control unit for communicating with the set-top terminal.

The preferred embodiment of the present invention utilizes a remote control 80, shown in FIG. 3, to communicate with the set-top terminal. It should be understood that the present invention is not limited to the use of the remote control unit shown in FIG. 3, but can be utilized with any suitable remote control unit. Similarly, the user can manipulate the control objects displayed via buttons, knobs, or other control mechanisms on the set-top terminal itself rather than the remote control. Thus, it should be understood that the remote control is the preferred method by which the user communicates with the set-top terminal to manipulate objects on the display screen and initiate action of the interactive system, but that any suitable method of communication with the set-top terminal will suffice.

FIG. 3 illustrates the preferred remote control unit 80, which is used to transmit commands to the set-top terminal 48. The remote control unit 80 includes a variety of keys that are common to remote control units for use with conventional television sets. These include power on/off 100, channel up 102, channel down 104, volume up 106, volume down 108, mute 110, and a 10 digit numeric keypad 112.

The preferred remote control unit also includes keys that are specifically related to the preferred interactive network system. A menu button 114 is used to open and close on-screen menus, such as a channel manger object. A directional control 116 is a rocker switch that is used to manipulate the channel manager and select specific items by moving a cursor up, down, left, or right. The directional control 116 can be moved in any of four positions: the up position 116a, the down position 116b, the left position 116c, and the right position 116d. An action button 118 is used to launch a selected function. A help key 120 is to initiate on-screen help. An "A" button 122 and "B" button 124 are used to select specific options that are provided in some contexts.

An example of a display screen displaying an interactive program in accordance with the present invention is shown in FIG. 4A–C. The interactive program, shown at 150 in FIG. 4A, preferably includes video, audio, graphical, and/or animation data. One example of such an interactive program includes the "Bill Nye the Science Guy" program, an interactive program for children, relating to science and nature, that is being developed by Microsoft Corporation of Redmond, Wash., the assignee of the present invention.

At predetermined times during the display of the interactive program, an additional information marker is displayed on the display screen. The additional information marker is preferably textual and is intended to convey to the user that additional information regarding the topic identified by the additional information marker. However, the additional information marker need not be text and may be displayed in any suitable form, including any combination of text, graphics, and/or animation. The purpose of the additional information marker is to inform the user that additional information is available about a particular topic. Multiple additional information markers can be displayed on the display screen simultaneously. The user can navigate to each additional information marker with the remote control to select the desired additional information marker.

An additional information marker, shown at 152 in FIG. 4B, is displayed on the display screen at predetermined times during the interactive program. Preferably, an additional information marker is displayed during that portion of the program in which the topic identified by the additional information marker is being discussed or displayed. The display of the additional information marker on the display screen is preferably altered or modified in a manner to allow the user to recognize that the additional information marker can be selected by the user. This alteration or highlighting feature is called "focus". The highlighting feature directs the user's attention to the additional information marker and operates as an indication that the user can control and initiate actions associated with the additional information marker. It should be understood that focus can be implemented utilizing various highlighting features to demonstrate to the user that focus is on a particular object. Focus can be demonstrated by magnification, color, audio, animation, graphics, or any other feature that serves to differentiate the object having focus from adjacent objects. For example, focus may be demonstrated by a cursor in the form of an arrow that may be shifted between objects on the screen to indicate to the user that that particular object may be selected.

When displayed on the screen, the additional information marker has focus, meaning that the user may select the additional information marker. Preferably, the additional information marker 152 is displayed in a manner to indicate to the user that the additional information marker has focus. For example, the additional information marker may move or jump around the display screen, pulsate, change colors, have animation or graphical elements associated therewith, or be displayed using any other means to draw the user's attention to the additional information marker. The additional information marker remains on the display screen for a predetermined amount of time, i.e., typically the time during which the additional information marker may be selected by the user.

Focus may be moved between objects displayed on the display screen by navigating. The user navigates by moving a cursor or other visible indication of control to different objects displayed on the display screen. Navigating can be accomplished by tabbing or roaming. Tabbing refers to a mode in which user input from the remote control indicates movement on the display screen that is constrained to a control object defined by the application programmer. When tabbing, the user presses the directional control 116 to move a cursor between objects on the display screen. The software associated with the subscriber service being utilized moves the cursor to the next adjacent control object on the display screen that can accept focus. By contrast, roaming refers to a mode in which user input from the remote control indicates free movement of a cursor on the display screen in a specified direction. Typically, the user continues to press the directional control on the remote control in real-time until the cursor, or other object providing visual feedback, appears at the desired position.

In the preferred embodiment of the present invention, the cursor can be shifted between selectable objects on the display screen by tabbing. When the cursor is positioned on or adjacent to the desired object, the user selects the object by pressing the action button 118 on the remote control.

When the user presses the action button 118 on the remote control 80 when the additional information marker is displayed on the screen, the interactive program is interrupted and removed from the display screen and an intervening informational segment associated with the additional information marker is displayed. An intervening informational segment is a relatively short (as compared to the interactive program) audio, video, graphical, and/or animated segment displayed on the display screen. The content of the intervening informational segment is related to the topic or subject identified by the additional information marker. Thus, in FIG. 4B, if the user presses the action button when the additional information marker "FOSSILS" is displayed, an intervening informational segment related to the subject of fossils, shown at 154 in FIG. 4C, is displayed. If the user does not select the additional information marker, the additional information marker is removed from the screen after a predetermined time. The additional information marker is preferably removed after the subject associated with the additional information marker is no longer being discussed or shown during the interactive program.

During display of the intervening informational segment, the interactive program is temporarily terminated and removed from the display screen. FIG. 4C is an example of the display screen as it would appear during the display of an intervening informational segment. In addition to the video displayed during the intervening informational segment, the display screen displays an exit button 156 and a cursor or pointing object 158. Selecting the exit button 156 causes the intervening informational segment to be terminated and causes the interactive program to be resumed. Additional objects may be displayed on the screen during an intervening informational segment.

To select a button or an object on the display screen, such as the exit button displayed during an intervening informational segment, the user manipulates the directional control 116 of the remote control 80. The user operates the directional control 116 of the remote control to shift focus between objects displayed on the screen that can accept focus. Thus, the user positions focus on a button or object by manipulating the directional control of the remote control until focus (or alternatively, the cursor 158) is associated with the desired object. When the object has focus or when the cursor is pointing to the desired object or button, the user initiates the function associated with that object or button by pressing the action button 118 on the remote control.

When the intervening informational segment is being displayed, the user may terminate the display of the intervening informational segment and return to the interactive program by selecting the exit button 156. Thus, selecting the exit button terminates the intervening informational segment and causes the interactive program to be displayed beginning at a predetermined return point.

It should be understood that an intervening informational segment can display an additional information marker, and therefore, an intervening informational segment can be accessed from the most recent intervening informational segment. It should be understood that the description of the present invention is not limited to the access of additional information markers directly from the interactive program, but that additional information markers can be displayed and selected from within a prior intervening informational segment.

Figure 5:
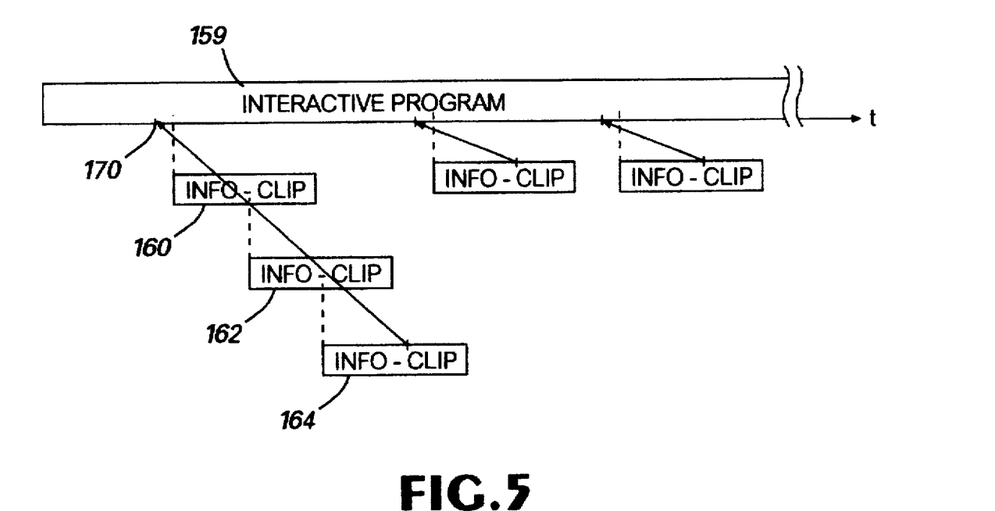
FIG. 5 is a time line demonstrating an example of the timing of the display of the program and intervening informational segments.

Therefore, additional information markers are not necessarily displayed only during the interactive program. As shown in FIG. 5, intervening informational segments may be launched from prior intervening informational segments to create multiple layers of intervening informational segments. In FIG. 5, intervening informational segment 164 was launched from an additional information marker that was displayed during intervening informational segment 162. Similarly, intervening informational segment 162 was launched from an additional information marker that was displayed during intervening informational segment 160. Intervening informational segment 160 was launched from an additional information marker displayed during the interactive program 159.

When the exit button 156 is selected by the user during the display of any intervening informational segment, the intervening informational segment is terminated, and the display of interactive program is resumed. In the preferred embodiment of the present invention, all return points are located within the interactive program. When multiple additional information markers are selected such that multiple levels of intervening informational segments are displayed, as shown at 160, 162, and 164 in FIG. 5, the return point 170 is located within the interactive program rather than within any of the prior intervening informational segments. In an alternative embodiment, return points may be located within prior intervening informational segments rather than in the interactive program.

The interactive program is preprocessed to identify those points within the program at which resumption after termination of an intervening informational segment would and would not be desired. For example, it is not desirable to return to the interactive program when the audio is in the middle of a word or in mid-sentence. Similarly, it is not desirable to return to the program in the middle of certain sequences of video. Those points within the interactive program at which the resumption of the program is desired are called "return points". Desired return points are preferably those parts of the program in which a pause occurs, either in the audio or video portions of the program.

Figure 6:
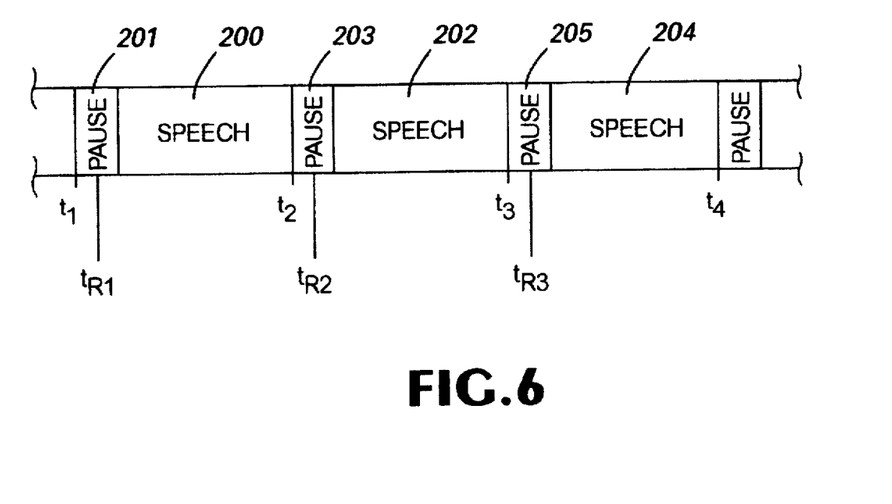
FIG. 6 is a diagram showing how the return points are selected to occur during natural breaks in the program.

An example of desired return points is shown in FIG. 6, which is a time line of the audio portion of the interactive program. Portions of the audio track are filled with speech or other audio, and are shown at 200, 202, and 204. Intervening portions of the audio are filled with pauses, shown at 201, 203, and 205. It is undesirable to locate return points $t_{r1}$, $t_{r2}$, and $t_{r3}$ during portions of speech and it is desirable to place the return points during the pauses, as shown in FIG. 6.

Figure 7:
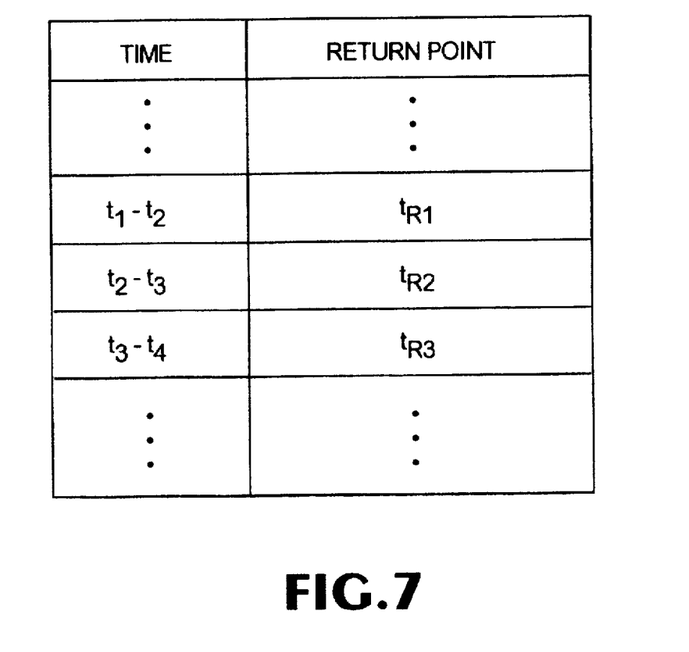
FIG. 7 is a table demonstrating how return points are associated with specific time intervals of the program.

The entire interactive program is preprocessed to determine the location of return points for the various times at which the interactive program can be resumed after an intervening informational segment. The preprocessing of the program is accomplished by analyzing the program, as shown in FIG. 6, to determine those portions of the program during which a pause or a natural break occurs. These pauses are determined to be desirable return points. For example, the table of FIG. 7 shows the return points for the portion of the program shown in FIG. 6. It should be understood that an additional information marker is displayed during the entire time shown in FIG. 6. If an additional information marker is not displayed on the display screen, no return point need be determined because the interactive program cannot be interrupted by an intervening informational segment and thus no return point for resumption of the interactive program is required.

When an additional information marker is selected by the user, the time, measured from the beginning of the interactive program, at which the user selected the additional information marker is stored. The time is compared to a table that contains the predetermined return points for various time intervals in the program. The table stores the time of the program at which the respective return points are to be placed.

An example of such a table is shown in FIG. 7. If an additional information marker is selected at any time from $t_1-t_2$, the table identifies the corresponding return point at $t_{r1}$. Return point $t_{r1}$ is shown in FIG. 6 as being located during pause 201. Thus, from FIGS. 6 and 7 it should be understood that all return points are located during pauses in the program. Thus, return points are not located in the middle of a word or sentence, and the transition back to the program from the intervening informational segment is smooth and easy for the user to tolerate. It is easier for the user to resume viewing the interactive program when the audio and/or video has not be chopped or clipped.

Similarly, if an additional information marker is selected anywhere from time $t_2-t_3$, the return point will be at time $t_{r2}$, seen in FIG. 6 as located during pause 203 in the audio portion of the program. All other return points for each additional information marker are preselected and stored in the table in a similar manner.

The length of time between times $t_1$, $t_2$, $t_3$, etc. can vary depending on the content of the program. The time intervals can be very short, such as one second, or can be longer. The time intervals and the selected return points are dependent on the audio and video content of the program, and therefore, no concrete rule can be established for determining the length of the intervals or the location of the return points.

Figure 8:
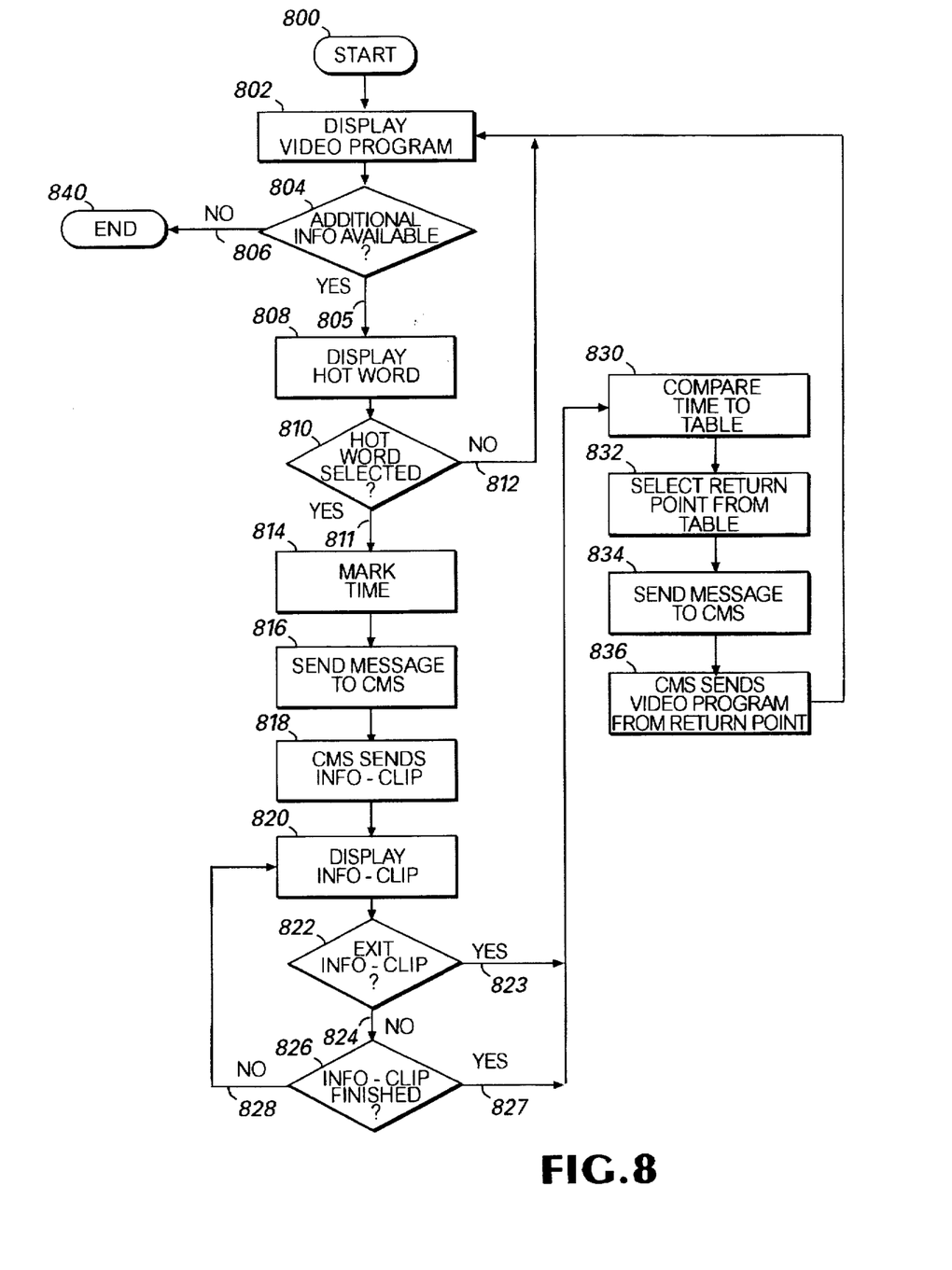
FIG. 8 is a flow chart of the steps required to implement the present invention.

The operation of the interactive network system in accordance with the present invention is described in the flow chart of FIG. 8. The method begins at step 800. At step 802, the output device 50 displays the interactive program on the display screen. At step 804, it is determined whether additional information is available with respect to the information being presented in the interactive program. If additional information regarding a topic being discussed in the program is available, then the interactive program displays an additional information marker. If an additional information marker is to be displayed, the method follows "yes" branch 805 to step 808 where an additional information marker is displayed. If no additional information marker is to be displayed, the method follows "no" branch 806, and the method terminates at 840.

At step 810, it is determined whether the user has pressed the action button when the additional information marker is displayed on the display screen. Is the action button is not pressed when the additional information marker is on the screen, the method follows "no" branch 812 and returns to step 802 to continuing displaying the program. If the action button has been pressed when the additional information marker is on the screen, indicating that the additional information marker has been selected, the method follows "yes" branch 811 to step 814.

At step 814, the time at which the additional information marker was selected is stored. The time is relative to the beginning of the interactive program and is measured only during the time that the interactive program is actually being displayed. Thus, the measurement of time for determining when additional information markers are selected does not include the time during which intervening informational segments are being displayed. The time is preferably determined from the MPEG interactive program data stream that is transmitted from the headend to the set-top terminal. In addition to the interactive program data, the MPEG data stream also contains time information relative to the beginning of the interactive program. Alternatively, the time may be kept by the continuous media server (CMS) 22, which transmits the interactive program data from the headend to the set-top terminal.

At step 816, the set-top terminal 48 sends a message to the continuous media server (CMS) 22 requesting that the appropriate intervening informational segment associated with the additional information marker be transmitted from the headend to the set-top terminal. At step 818, the CMS 22 transmits the intervening informational segment audio and video information to the set-top terminal, and the set-top terminal displays the intervening informational segment on the display screen at step 820.

At step 822, it is determined whether the user has selected the exit button displayed on the display screen during the intervening informational segment. If the exit button has been selected, meaning the user wishes to terminate the intervening informational segment and return to the program, the method follows "yes" branch 823 to step 830.

If, at step 822, it is determined that the exit button has not been selected, meaning the user desires to continue viewing the intervening informational segment, the method follows "no" branch 824 to step 826 where it is determined whether the entire intervening informational segment has been displayed. If the intervening informational segment has been completely displayed, the method follows "yes" branch 827 to step 830. If the intervening informational segment has not been completed, the method follows "no" branch 828 and returns to step 820 where the intervening informational segment continues to be displayed.

At step 830, the time at which the additional information marker was selected is compared to the return point table (FIG. 7), which is preferably stored in the RAM of the set-top terminal but which can also be stored at the headend. The time at which the additional information marker was selected is compared to the entries in the return point table to determine the proper return point, at step 832.

When the return point is determined, a message is sent to the CMS 22, at step 834, to transmit the program from the headend to the set-top terminal starting from the time corresponding to the return point. The interactive program is then displayed at step 836, and the method return to step 802.

From the foregoing, it will be appreciated that the preferred embodiment of the present invention overcomes the drawbacks of the prior art described hereinabove and accomplishes the previously stated objects of the present invention. From the description of the preferred embodiment equivalents of the elements shown therein will suggest themselves to those skilled in the art and ways of constructing other embodiments of the present invention will suggest themselves to practitioners of the art. Therefore, the scope of the present invention is to be limited only by the claims below.

What is claimed is:

1. A method for displaying an interactive program with intervening informational segments on a display screen, comprising the steps of:

predetermining return points in the interactive program by preprocessing the interactive program to identify natural breaks in the audio or video of the interactive program;

displaying the interactive program on the display screen;

displaying at least one additional information marker on the display screen during the display of the interactive program;

accepting the selection of one of the additional information markers from a user of the interactive program;

terminating the interactive program after accepting the selection of one of the additional information markers;

displaying an intervening informational segment on the display screen associated with the selected additional information marker;

upon termination of the intervening informational segment, redisplaying the interactive program beginning at one of said predetermined return points.

2. The method of claim 1 wherein said additional information markers are hot words.

3. The method of claim 1 wherein the user selects one of the additional information markers by manipulating a remote control.

4. The method of claim 1 wherein the display of at least one of said additional information markers is textual.

5. The method of claim 1 wherein the display of said additional information markers has a visual effect to indicate to the user that they are selectable.

6. The method of claim 1 wherein said intervening informational segment displays information related to said selected additional information marker.

7. The method of claim 1 wherein an exit button is displayed on the display screen during the display of said intervening informational segment, and wherein selection of said exit button terminates said intervening informational segment.

8. The method of claim 1 wherein selection of one of said predetermined return points for redisplaying the interactive program is dependent on the time at which one of the additional information markers was selected.

9. The method of claim 8 where the time at which one of the additional information markers was selected is determined relative to the elapsed running time of the interactive program from the beginning of the interactive program.

10. The method of claim 9 wherein the location of each of said return points is identified relative to the running time of the interactive program from the beginning of the interactive program.

11. The method of claim 10 wherein time intervals during which an additional information marker may be selected and the location of the corresponding return points are stored in a table, and wherein selection of the appropriate return point for redisplaying the interactive program is determined by examining the table.

12. The method of claim 8 wherein said return point is concurrent with or prior to the time at which the additional information marker was selected.

13. The method of claim 1 wherein at least one second-layer additional information marker is displayed during the display of said intervening informational segment.

14. The method of claim 13 wherein a second-layer intervening informational segment is displayed upon selection of one of said second-layer additional information markers.

15. The method of claim 14 wherein the interactive program is redisplayed upon termination of said second-layer intervening informational segment.

16. The method of claim 14 wherein the prior intervening informational segment is redisplayed upon termination of said second layer intervening informational segment.

17. The method of claim 1 wherein the display of at least one of said additional information markers is graphical.

18. A system, in connection with an interactive network system, for displaying an interactive program with intervening informational segments on a display screen, comprising:

means for preprocessing said interactive program to identify natural breaks in the audio or video of said interactive program, thereby predetermining return points in said interactive program;

means for displaying the interactive program on the display screen;

means for displaying at least one additional information marker on the display screen during the display of said interactive program;

means for accepting the selection of one of said additional information markers from a user of said interactive program;

means for terminating the interactive program upon accepting the selection of one of the additional information markers;

means for displaying an intervening informational segment on the display screen associated with said selected additional information marker;

means for redisplaying said interactive program beginning at one of said predetermined return points upon termination of said intervening informational segment.

19. The system of claim 18 wherein said additional information markers are hot words.

20. The system of claim 18 wherein the user selection of one of said additional information markers is accomplished by a remote control.

21. The system of claim 18 wherein at least one of said additional information markers is textual.

22. The system of claim 18 wherein said additional information markers have a visual effect to indicate to the user that they are selectable.

23. The system of claim 18 wherein said intervening informational segment displays information related to said selected additional information marker.

24. The system of claim 18 wherein an exit button is displayed on said display screen during the display of said intervening informational segment, and wherein selection of said exit button terminates said intervening informational segment.

25. The system of claim 18 wherein selection of one of said predetermined return points for redisplaying said interactive program is dependent on the time at which one of said additional information markers was selected.

26. The system of claim 25 where the time at which one of said additional information markers was selected is determined relative to the elapsed running time of the interactive program from the beginning of the interactive program.

27. The system of claim 26 wherein the location of each of said return points is identified relative to the elapsed running time of the interactive program from the beginning of the interactive program.

28. The system of claim 27 wherein time intervals during which an additional information marker may be selected and the location of the corresponding return points are stored in a table, and wherein the selection of the appropriate return point for redisplaying the interactive program is determined by examining said table.

29. The system of claim 28 wherein said table is stored in the RAM of a set-top terminal associated with said interactive network system.

30. The system of claim 28 wherein said table is stored at a headend of said interactive network system.

31. The system of claim 25 wherein said return point is concurrent with or prior to the time at which the additional information marker was selected.

32. The system of claim 18 wherein at least one second-layer additional information marker is displayed during the display of said intervening informational segment.

33. The system of claim 32 wherein a second-layer intervening informational segment is displayed upon selection of one of said second-layer additional information markers.

34. The system of claim 33 wherein said interactive program is redisplayed upon termination of said second-layer intervening informational segment.

35. The system of claim 33 wherein the prior intervening informational segment is redisplayed upon termination of said second-layer intervening informational segment.

36. The system of claim 18 wherein said predetermined return points associated with said additional information markers are stored in a table.

37. The system of claim 36 wherein said table is stored at a headend of said interactive network system.

38. The system of claim 36 wherein said table is stored at a set-top terminal of said interactive network system.

39. The system of claim 18 wherein said intervening informational segment is stored at a headend of said interactive network system.

40. The system of claim 18 wherein said intervening informational segment is stored at a set-top terminal of said interactive network system.

41. The system of claim 26 wherein said interactive program is transmitted as a data stream from a headend to a set-top terminal, and wherein said data stream includes the time measured from the beginning of the interactive program, and wherein the time at which one of said additional information markers was selected is obtained from said data stream.

42. The system of claim 26 wherein said interactive program is transmitted as a data stream from a server at a headend to a set-top terminal, and wherein said server maintains the time measured from the beginning of the interactive program, and wherein the time at which one of said additional information markers was selected is obtained from said server.

43. The system of claim 18 wherein the display of at least one of said additional information markers is graphical.

* * * * *